(12) United States Patent
Fujioka (10) Patent No.: US 10,514,455 B2
(45) Date of Patent: Dec. 24, 2019

(54) RADAR APPARATUS AND METHOD OF TRACKING TARGET OBJECT

(71) Applicant: Furuno Electric Co., Ltd., Nishinomiya (JP)

(72) Inventor: Daisuke Fujioka, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 459 days.

(21) Appl. No.: 15/408,829

(22) Filed: Jan. 18, 2017

(65) Prior Publication Data

US 2017/0212232 A1  Jul. 27, 2017

(30) Foreign Application Priority Data

Jan. 22, 2016  (JP) .................... 2016-010579

(51) Int. Cl.
*G01S 13/72* (2006.01)
*G01S 13/42* (2006.01)
(Continued)

(52) U.S. Cl.
CPC ............. *G01S 13/72* (2013.01); *G01S 7/24* (2013.01); *G01S 13/426* (2013.01);
(Continued)

(58) Field of Classification Search
CPC ...... G01S 13/426; G01S 13/582; G01S 13/62; G01S 13/72; G01S 13/726;
(Continued)

(56) References Cited

U.S. PATENT DOCUMENTS 3,699,573 A  10/1972  Andrew et al.
9,165,364 B1 * 10/2015  Kishi ................ G06T 7/74
(Continued)

FOREIGN PATENT DOCUMENTS

JP  2000304853 A  11/2000
JP  2004309246 A  11/2004
JP  2014235040 A  12/2014

OTHER PUBLICATIONS

Kural, F. et al., "Incorporating Doppler Velocity Measurement for Track Initiation and Maintenance", In Proceedings of the IEE Seminar on Target Tracking: Algorithms and Applications 2006, Mar. 7, 2006, Birmingham, UK, 8 pages.
(Continued)

*Primary Examiner* — Timothy X Pham
(74) *Attorney, Agent, or Firm* — Alleman Hall Creasman & Tuttle LLP (57) ABSTRACT

A radar apparatus is provided, which includes an approaching velocity calculating module configured to calculate an approaching velocity of a target object from which a reflection wave caused by an electromagnetic wave is obtained, based on a change in one of phase and frequency of the electromagnetic wave transmitted and received by a radar antenna, the approaching velocity being a velocity component in a transmission direction of the electromagnetic wave, a tracking determining module configured to determine whether to track the target object based on the approaching velocity of the target object, a tracking module configured to automatically track the target object determined to be tracked by the tracking determining module, and a display controlling module configured to display the tracking result of the tracking module along with a radar image.

12 Claims, 5 Drawing Sheets

(51) Int. Cl.
  *G01S 13/58* (2006.01)
  *G01S 7/24* (2006.01)
  *G01S 13/62* (2006.01)
  *G01S 13/93* (2006.01)

(52) U.S. Cl.
  CPC ............ *G01S 13/582* (2013.01); *G01S 13/62* (2013.01); *G01S 13/726* (2013.01); *G01S 13/9307* (2013.01)

(58) Field of Classification Search
  CPC ........ G01S 13/9307; G01S 7/24; G01S 13/66; G01S 13/723; G01S 7/04
  USPC ....................................................... 342/107
  See application file for complete search history.

(56) References Cited

U.S. PATENT DOCUMENTS

2008/0111730 A1    5/2008   Ding et al.
2010/0289690 A1*  11/2010  Dai .......................... G01S 7/062
                                                                          342/41
2013/0187806 A1*   7/2013  Takemoto ............. G01S 13/582
                                                                          342/90
2014/0354466 A1   12/2014  Nomura
2015/0130654 A1*   5/2015  Dai .......................... G01S 13/22
                                                                          342/104
2016/0299223 A1*  10/2016  Testa ........................ G01S 3/02

OTHER PUBLICATIONS

Wang, X. et al., "Enhanced Multi-Target Tracking with Doppler Measurements", In Proceedings of Information, Decision and Control, 2007 (IDC '07), Feb. 12, 2007, Adelaide, Australia, 6 pages.
Liu, H. et al., "Doppler-Aided Track Initiation Algorithm", In Proceedings of the 2015 IEEE Radar Conference, Oct. 27, 2015, Johannesburg, South Africa, 4 pages.
European Patent Office, Extended European Search Report Issued in European Application No. 17151763.4, dated Jun. 19, 2017, Germany, 11 pages.

\* cited by examiner

DOPPLER ABSOLUTE VELOCITY
= DOPPLER RELATIVE VELOCITY
+ ABSOLUTE VELOCITY OF FIRST SHIP
   (VELOCITY COMPONENT IN DIRECTION IN WHICH TARGET OBJECT IS LOCATED)

RADAR APPARATUS AND METHOD OF TRACKING TARGET OBJECT

CROSS-REFERENCE TO RELATED APPLICATION(S)

This application claims priority under 35 U.S.C. § 119 to Japanese Patent Application No. 2016-010579, which was filed on Jan. 22, 2016, the entire disclosure of which is hereby incorporated by reference.

TECHNICAL FIELD

This disclosure mainly relates to a radar apparatus which has a function to track a target object and determines whether to track a target object.

BACKGROUND

Conventionally, radar apparatuses having a TT (Target Tracking) function to track a target object based on echo signals received by a radar antenna are known. The TT function is a function to detect a transition in position of a target object around a ship based on a transition in radar image obtained before a current timing. With this TT function, for example, it is possible to display a target object having a possibility of colliding against the ship, by assigning a given mark thereto.

JP2004-309246A discloses a radar apparatus having the TT function. This radar apparatus sets a given range rearward of a ship and, once a target object being tracked enters this range, stops the tracking of the target object.

JP2000-304853A stores target object data obtained before a current timing and, based on this target object data, calculates a current velocity vector of a specific target object specified by a user.

JP2014-235040A discloses a radar apparatus which automatically starts tracking a target object determined to have a collision risk against a ship. This radar apparatus determines the collision risk based on a distance to the target object, a speed of the target object, a CPA (Closest Point of Approach), etc. This speed of the target object is obtained based on a change in position of the target object obtained in every scan.

In JP2014-235040A, whether to start the tracking is determined based on the speed of the target object. However since the direction of the speed of the target object is not taken into consideration in JP2014-235040A, the target object is treated the same regardless of it moving toward or away from the ship. Moreover, in JP2000-304853A and JP2014-235040A, since the speed of the target object is calculated by using the positional change of the target object, it is required to determine radar echoes in previous and latest scans which are based on the same target object, thus the processing amount increases.

SUMMARY AND EFFECTS

The purpose of the present disclosure relates to providing a radar apparatus having the TT function, which extracts a target object having a high collision risk with simple processing and automatically tracks the target object.

According to one aspect of this disclosure, a radar apparatus with the following configuration is provided. That is, the apparatus includes an approaching velocity calculating module configured to calculate an approaching velocity of a target object from which a reflection wave caused by an electromagnetic wave is obtained, based on a change in one of phase and frequency of the electromagnetic wave transmitted and received by a radar antenna, the approaching velocity being a velocity component in a transmission direction of the electromagnetic wave, a tracking determining module configured to determine whether to track the target object based on the approaching velocity of the target object, a tracking module configured to automatically track the target object determined to be tracked by the tracking determining module, and a display controlling module configured to display the tracking result of the tracking module along with a radar image.

Since whether to track the target object is determined based on the approaching velocity which is the velocity of the target object toward the apparatus, it is possible to automatically track a target object having a high collision risk against the apparatus (to be more exact, a movable body on which the apparatus is mounted, etc.). Further, in a case where the approaching velocity is calculated by using a positional change of the target object as JP2000-304853A and JP2014-235040A, it is required to determine radar echoes in previous and latest scans which are based on the same target object, thus the processing amount increases. In this regard, by calculating the approaching velocity based on the change in one of phase and frequency of the electromagnetic wave, the approaching velocity of the target object may be calculated in a single scan without the determination of the radar echoes as JP2000-304853A and JP2014-235040A, and as a result, it is possible to reduce the processing amount regarding the calculation of the approaching velocity.

The tracking determining module may determine whether to track the target object based on the approaching velocity calculated in a single scan.

Since the approaching velocity of the target object is calculated in a single scan unlike JP2000-304853A and JP2014-235040A, it is possible to quickly determine whether to track the target object.

The radar apparatus described above may further include a memory configured to store the plurality of approaching velocities calculated in a plurality of scans, respectively, for every target object. The tracking determining module may include a tracking candidate determining submodule configured to determine whether the target object is a tracking candidate based on the approaching velocity calculated in a single scan, and a tracking target determining submodule configured to determine whether to track the target object determined as the tracking candidate by the tracking candidate determining submodule, based on the plurality of approaching velocities of the target object calculated in the plurality of scans and stored in the memory.

Since the tracking target determining submodule performs the determination based on the plurality of approaching velocities, due to the requirement to determine radar echoes which are based on the same target object, the processing amount may increase. In this regard, with the above configuration, the tracking target determining submodule performs the determination only for the tracking candidate determined by the tracking candidate determining submodule, thus it is possible to reduce the processing amount significantly.

The tracking target determining submodule may determine radar echoes obtained from a single target object among radar echoes obtained in the plurality of scans, based at least on the approaching velocities.

Thus, the approaching velocity calculated by the approaching velocity calculating module may be used not only for the determination of the tracking but also for the determination of the radar echoes.

The approaching velocity may be a velocity component of the target object in the transmission direction of the electromagnetic wave.

Thus, it is possible to detect a static target object (i.e., a channel buoy) and, as a result, prevent tracking of the static target object.

The approaching velocity may be a relative velocity of the target object to the apparatus in the transmission direction of the electromagnetic wave.

Thus, it is possible to accurately detect the velocity of the target object toward the apparatus and, as a result, selectively track only the target object having a high collision risk against the apparatus.

The radar apparatus described above may further include a representative point detecting module configured to detect a representative point defining a representative position of the target object. The tracking determining module may determine whether to track the target object based on the plurality of approaching velocities calculated by using a plurality of electromagnetic waves obtained from the target object in a single scan by the radar antenna, respectively.

The determination is performed based on the plurality of the approaching velocities as above, thus, it is possible to improve an accuracy of the determination.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
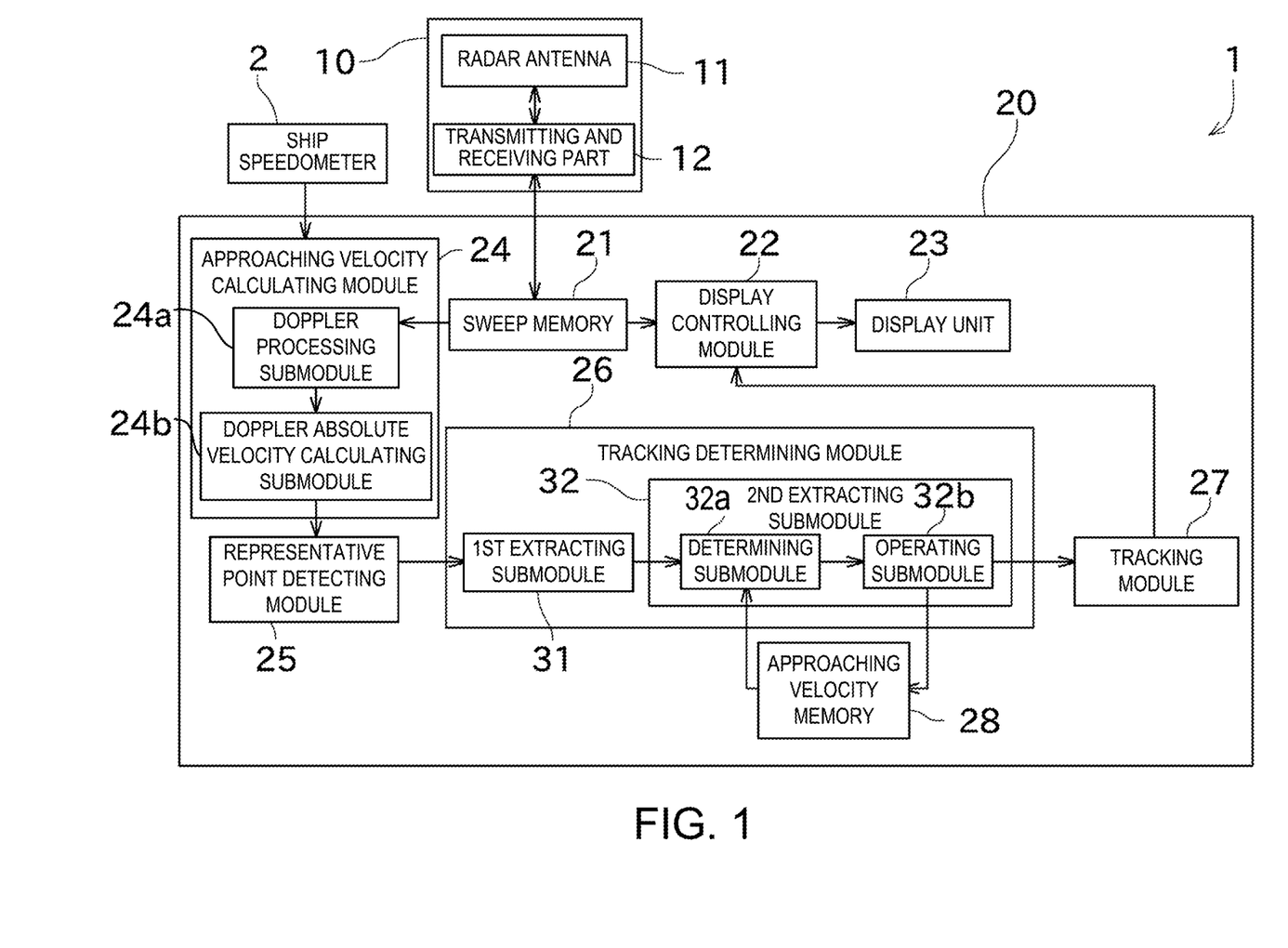
FIG. 1 is a block diagram of a radar apparatus according to one embodiment of this disclosure.

One embodiment of this disclosure is described with reference to the appended drawings. In the following embodiment, an example is illustrated in which this disclosure is applied to a ship (movable body). However, the present disclosure may be applied to any kinds of vehicles having a rudder or a similar steering device, such as other watercrafts including boats, vessels, and submarines, as well as land vehicles, airplanes and spaceships. FIG. 1 is a block diagram of a radar apparatus 1 according to this embodiment of this disclosure.

The radar apparatus 1 of this embodiment illustrated in FIG. 1 may be mounted on a ship (hereinafter, may be referred to as "the first ship") and generally used for a detection of a target object, such as another ship (hereinafter, may be referred to as "the second ship"). The radar apparatus 1 may generate a pulse-shaped electromagnetic wave to be transmitted externally by an oscillator (not illustrated) made of semiconductor. The radar apparatus 1 may perform the detection around the apparatus (around the first ship) by repeatedly transmitting and receiving electromagnetic waves while rotating a radar antenna 11 in a horizontal plane. With this configuration, a scan may be performed in the horizontal plane, over 360° centering on the first ship.

Note that, a radar apparatus having a configuration that the radar antenna 11 does not rotate may be applied. For example, a radar apparatus including antenna elements over an entire circumference, a radar apparatus configured to perform the detection only in a particular direction (e.g., front direction), etc. may not need to rotate the radar antenna. Further, the radar antenna 11 is not limited to be a single antenna which performs both the transmission and the reception of the radio wave, and may include an antenna for transmission and an antenna for reception.

As illustrated in FIG. 1, the radar apparatus 1 may include an antenna unit 10 and a radar control device 20.

The antenna unit 10 may be attached to a given position (e.g., a mast) of the first ship. The antenna unit 10 may include the radar antenna 11 and a transmitting and receiving part 12.

The radar antenna 11 is capable of transmitting the pulse-shaped electromagnetic wave with sharp directivity, and receiving a reflection wave from the target object around the apparatus. Hereinafter, an operation from a transmission of the electromagnetic wave to the next transmission may be referred to as "sweep" and an operation that the radar antenna 11 rotates once fully)(360° while transmitting and receiving the electromagnetic waves may be referred to as "scan."

The transmitting and receiving part 12 may process each wave received by the radar antenna 11 to acquire data (reception data) and output the processed data to the radar control device 20. The reception data may include information indicating a position and amplitude of a radar echo (reflection wave). The processing performed by the transmitting and receiving part 12 may include amplification, downconversion in frequency, A/D conversion.

The radar control device 20 may include a sweep memory 21, a display controlling module 22, a display unit 23, an approaching velocity calculating module 24, a representative point detecting module 25, a tracking determining module 26, a tracking module 27, and an approaching velocity memory (memory) 28. The display controlling module 22, the approaching velocity calculating module 24, the representative point detecting module 25, the tracking determining module 26, and the tracking module 27 may be achieved by a processor, such as an FPGA, an ASIC or a CPU (none of these are illustrated), provided to the radar apparatus 1.

The sweep memory 21 may be a buffer memory capable of storing the reception data for one sweep in realtime. The sweep memory 21 may store the reception data obtained in one sweep in a chronological order.

The display controlling module 22 is capable of generating a radar image by performing known signal processing on the reception data stored in the sweep memory. For example, the display controlling module 22 may calculate a distance from the first ship (the radar antenna 11) to the target object based on a difference between timings of transmission and reception of the electromagnetic wave by the radar antenna 11. Further the display controlling module 22 may acquire a direction in which the target object is located based on the orientation of the radar antenna 11 when receiving the electromagnetic wave (transmission and reception directions of the electromagnetic wave). Thus, the display controlling module 22 performs the control of generating and displaying the radar image indicating the position of the target object around the first ship (display control process).

Figure 2:
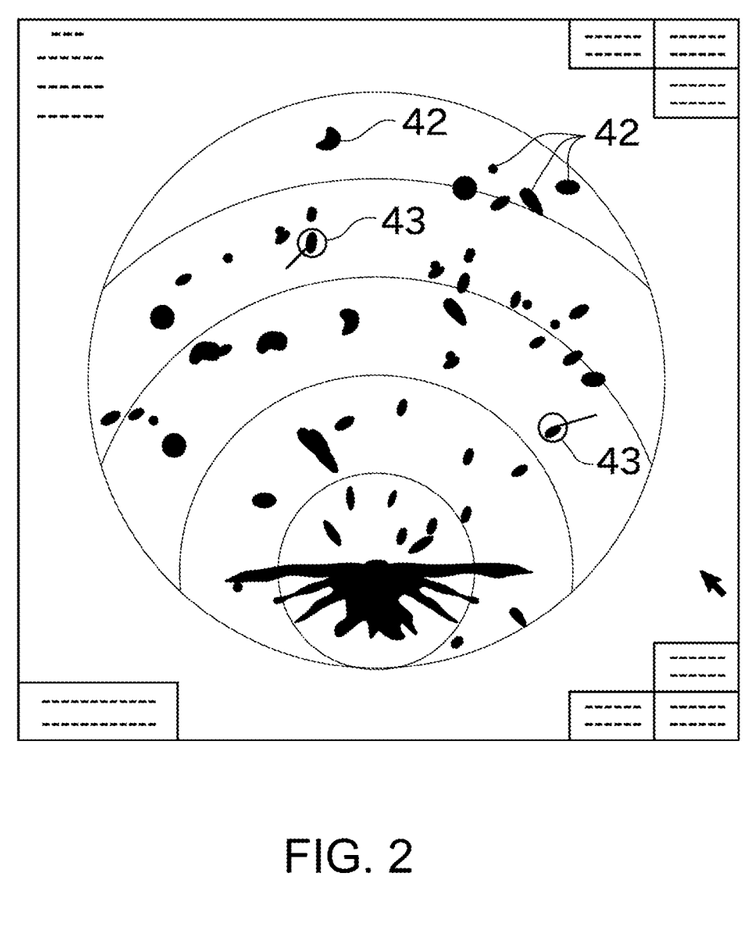
FIG. 2 is a view illustrating an example of a radar image displayed on a display unit.

The display unit 23 is configured by, for example, a liquid crystal display (LCD), and may display the image generated by the display controlling module 22. FIG. 2 illustrates one example of the radar image. To briefly describe the radar image, the center of substantially concentric circles may indicate a position of the first ship, and multiple radar echoes 42 are displayed. Further, some of the radar echoes 42 may be displayed with TT marks 43. Each TT mark 43 may indicate the radar echo 42 of the target object being tracked by the tracking module 27 (described later in detail).

The approaching velocity calculating module 24 may calculate an approaching velocity of the target object from which the reflection waves are obtained, by performing Doppler processing based on a phase change in the electromagnetic waves transmitted and received by the radar antenna 11 (approaching velocity calculating process). The approaching velocity may be a velocity component of the target object in the transmission direction of the electromagnetic wave, and may be a velocity used for the determination of whether to track the target object. In this embodiment, "the velocity of the target object" may mean "the absolute velocity of the target object." The approaching velocity may be a scalar quantity, for example, the velocity toward the first ship indicates a positive velocity and the velocity away from the first ship indicates a negative velocity (may be opposite). The approaching velocity calculating module 24 may include a Doppler processing submodule 24a and a Doppler absolute velocity calculating submodule 24b.

The Doppler processing submodule 24a may obtain a Doppler frequency by the pulse Doppler (pulse pair) method and calculate a Doppler velocity of the target object based on the Doppler frequency. For example, for reflection waves obtained from a single target object in a plurality of continuous sweeps, the Doppler processing submodule 24a may obtain the phase change between a carrier wave of the reflection wave in the chronologically oldest sweep among the plurality of continuous sweeps and a carrier wave of the reflection wave in the next sweep thereto. Further the Doppler processing submodule 24a may calculate the Doppler frequency at a plurality of points based on this phase change. The Doppler processing submodule 24a may also calculate a Doppler relative velocity based on this Doppler frequency.

The Doppler relative velocity may be a relative velocity of the target object to the apparatus in the transmission direction of the electromagnetic wave. Since the Doppler frequency occurs based on the relative velocity of the target object and the first ship, with the Doppler frequency, the Doppler relative velocity may be calculated. Generally, when the Doppler velocity is simply referred to as it is, it may indicate the Doppler relative velocity.

The Doppler absolute velocity calculating submodule 24b may calculate the Doppler absolute velocity based on the Doppler relative velocity obtained by the Doppler processing submodule 24a. Here, the radar control device 20 may receive the velocity of the first ship from a ship speedometer 2 which is provided externally of the radar control device 20. Therefore, the Doppler absolute velocity (the absolute velocity of the target object in the transmission direction of the electromagnetic wave) may be calculated based on the Doppler relative velocity and the velocity of the first ship. Note that the Doppler relative velocity and the Doppler absolute velocity may be scalar quantities, and the positive and negative directions may be set similarly to those of the approaching velocity.

Figure 3:
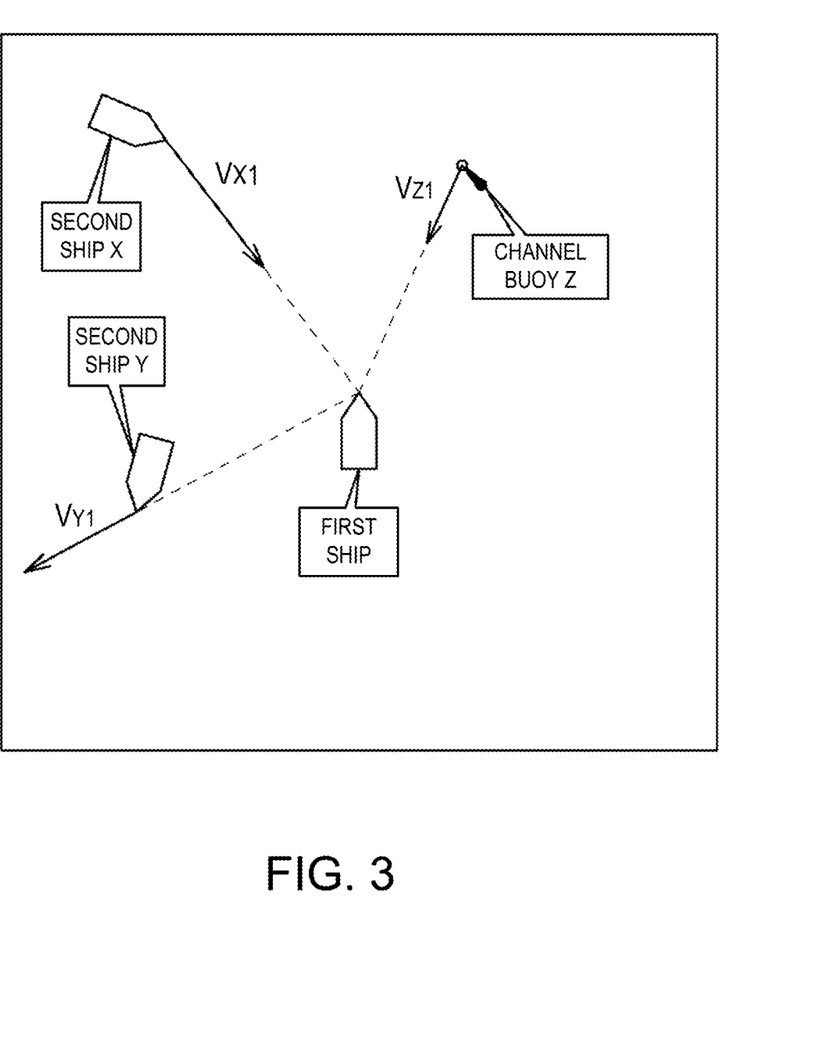
FIG. 3 is a view illustrating Doppler relative velocities $V_{X1}$, $V_{Y1}$ and $V_{Z1}$.
Figure 4:
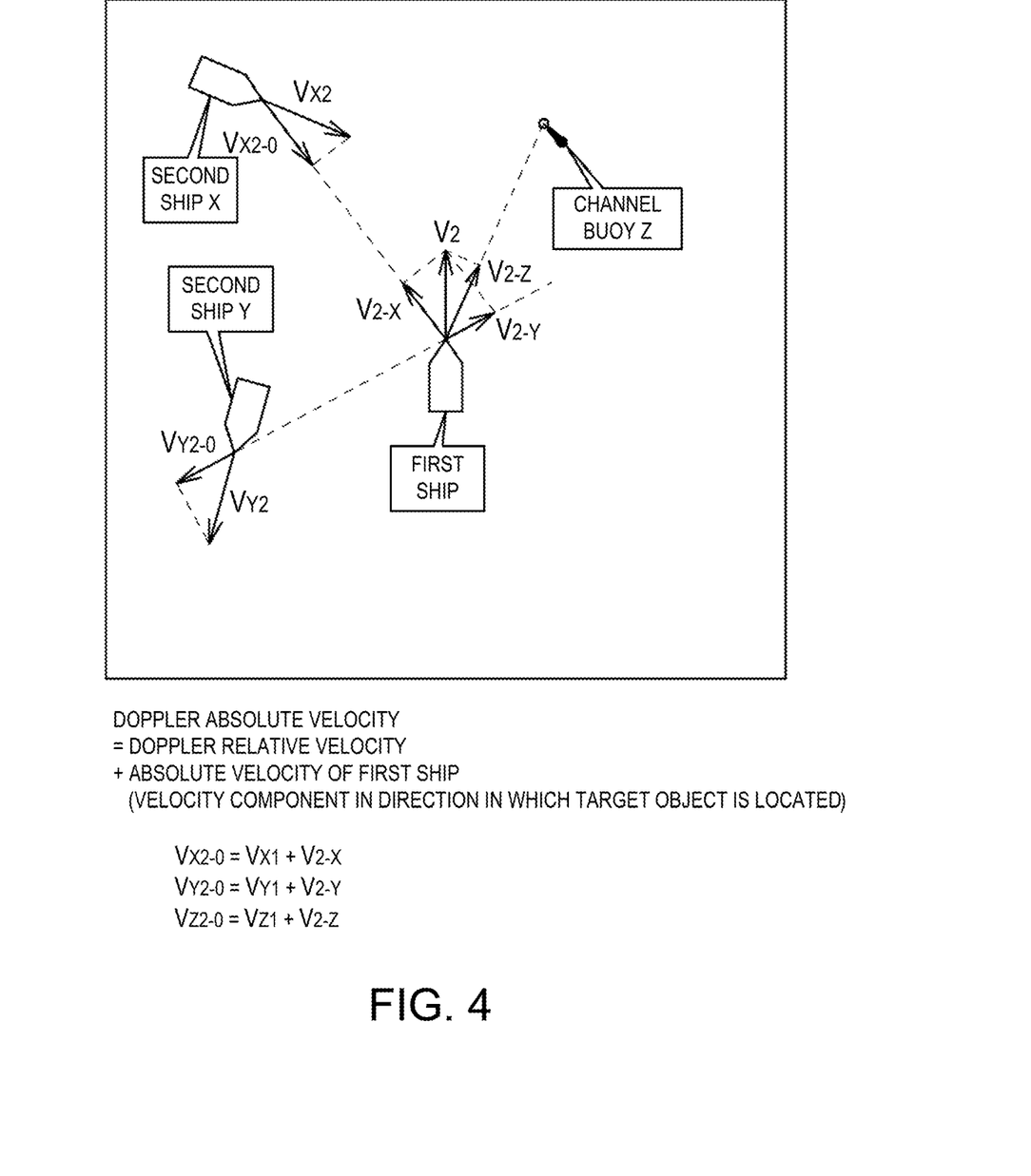
FIG. 4 is a view illustrating Doppler absolute velocities $V_{X2\text{-}0}$, $V_{Y2\text{-}0}$ and $V_{Z2\text{-}0}$.

Hereinafter, the Doppler relative velocity and the Doppler absolute velocity are described with reference to FIGS. 3 and 4. FIG. 3 is a view illustrating the Doppler relative velocity. FIG. 4 is a view illustrating the Doppler absolute velocity.

As illustrated in FIG. 3, a situation where second ships X and Y and a channel buoy Z exist around the first ship. The Doppler relative velocities of the second ship X, the second ship Y, and the channel buoy Z obtained by the Doppler processing submodule 24a are $V_{X1}$, $V_{Y1}$ and $V_{Z1}$, respectively. The Doppler relative velocity may be a velocity component of the target object in relation to the first ship in the transmission direction of the radio wave, in other words, a velocity component of the target object in relation to the first ship in a direction of a straight line connecting the first ship (the apparatus) to the target object concerned. Note that, although the channel buoy basically does not move, since the first ship is in movement, the relative velocity to the first ship may be not zero.

Next, the absolute velocities and the Doppler absolute velocities of the first ship, the second ships X and Y, and the channel buoy Z are considered. As illustrated in FIG. 4, the absolute velocities of the first ship, the second ships X and Y, and the channel buoy Z are $V_2$, $V_{X2}$, $V_{Y2}$ and $V_{Z2}$, respectively. Note that since the channel buoy Z is fixed on the sea, $V_{Z2}$ may be zero or close to zero. Further, the velocity component of the absolute velocity $V_2$ of the first ship in the direction in which the second ship X is located is $V_{2-X}$, the velocity component of the absolute velocity $V_2$ of the first ship in the direction in which the second ship Y is located is $V_{2-Y}$, and the velocity component of the absolute velocity $V_2$ of the first ship in the direction in which the channel buoy Z is located is $V_{2-Z}$. Moreover, the velocity component of the absolute velocity $V_{X2}$ of the second ship X in the direction in which the first ship is located is $V_{X2-0}$. Similarly, the velocity component of the absolute velocity $V_{Y2}$ of the second ship Y in the direction in which the first ship is located is $V_{Y2-0}$. Here, since each of $V_{X2-0}$ and $V_{Y2-0}$ is the velocity component in the transmission direction of the electromagnetic wave, it may be the Doppler absolute velocity.

Based on a general relationship between the relative velocity and the absolute velocity, the equation "Doppler relative velocity=Doppler absolute velocity—Absolute velocity of the first ship in the direction in which the target object is located" may be satisfied. Thus, the equation "Doppler absolute velocity=Doppler relative velocity+Absolute velocity of the first ship in the direction in which the target object is located" may be satisfied. The Doppler absolute velocity calculating submodule 24b may calculate the Doppler absolute velocity based on this equation. The approaching velocity calculating module 24 may add the information of the approaching velocity (Doppler absolute velocity) to the reception data and output them to the representative point detecting module 25.

Figure 5:
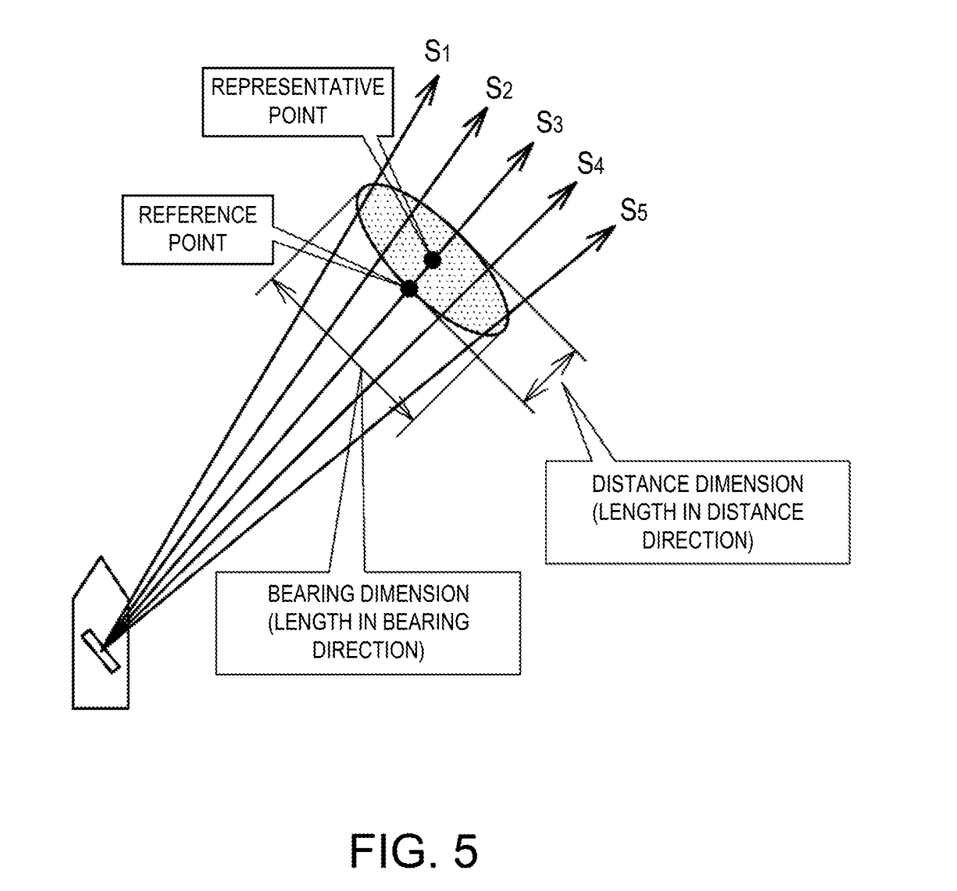
FIG. 5 is a view schematically illustrating a representative point of a target object.

The representative point detecting module 25 may detect a representative point defining a representative position of the target object based on the radar echo obtained by transmitting and receiving the electromagnetic wave. That is, since positions (geographical positions) corresponding to the radar echoes may spread horizontally, the representative point may be set to determine the position of the target object used in various operations. For example, the representative point detecting module 25 may detect a reference point and dimensions of the spread of the positions corresponding to the radar echoes in the distance and bearing directions which are illustrated in FIG. 5, based on the reception data. Thus, it is possible to determine the target object based on which the reception data is obtained. Further, the representative point detecting module 25 may obtain the center of mass of the radar echoes or the center of the positions corresponding to the radar echoes based on the reference point and the dimensions of the spread (in this embodiment, the representative point). Note that although the center of the positions corresponding to the radar echoes is the representative point in this embodiment, a different point may be the representative point. The representative point detecting module 25 may add to the reception data the information of the target object based on which the reception data is obtained, and output them to the tracking determining module 26.

The tracking determining module 26 may determine whether to track the target object based on the approaching velocity of the target object obtained by the approaching velocity calculating module 24 (tracking determining process). Here as illustrated in FIG. 5, in a case where three or more reflection waves returned from a single target object in one scan, a plurality of approaching velocities may be calculated based on the single target object. In this case, the approaching velocity of the target object may be obtained based on the plurality of approaching velocities which are calculated based on the reflection waves (electromagnetic waves), respectively. In this embodiment, an average of the plurality of approaching velocities may be the approaching velocity of the target object concerned.

The tracking determining module 26 may include a first extracting submodule 31 (tracking candidate determining submodule) and a second extracting submodule 32 (tracking target determining submodule).

The first extracting submodule 31 may extract the target object satisfying a first extraction condition (the target object to be a tracking candidate) from detected target objects (first extraction). Here, if the number of detected target objects is one, the first extracting submodule 31 may function as the tracking candidate determining submodule to determine whether the detected target object is a tracking candidate. The first extraction condition may be that the approaching velocity of the target object calculated in a single scan is a given threshold (>0) or above. That is, since the possibility of collision increases as the approaching velocity becomes higher as a positive value due to the approaching velocity toward the first ship becoming higher, a positive value may be set as the threshold. Especially in this embodiment, since the Doppler absolute velocity is used as the approaching velocity, it is possible to set the approaching velocity of the channel buoy to zero or close to zero, and thus, extraction of the channel buoy is prevented. Moreover, the first extracting submodule 31 may perform the first extraction based on the radar echoes every time latest reception data is inputted.

The second extracting submodule 32 may determine whether a second extraction condition is satisfied by using only the target object extracted by the first extracting submodule 31, based on a plurality of approaching velocities calculated in a plurality of scans (second extraction). The second extraction condition of this embodiment may be that the approaching velocity is the threshold (>0) or above at least n times (scans) continuously. The second extracting submodule 32 may include a determining submodule 32a and an operating submodule 32b.

Here, the approaching velocity memory 28 may store the information regarding the radar echoes detected in previous scans, based on the information outputted from the second extracting submodule 32. For example, the approaching velocity memory 28 may store the positions corresponding to the radar echoes, the dimensions of the spread thereof, and the approaching velocities, and additionally the number of times of the approaching velocity being the threshold or above.

The determining submodule 32a may determine the radar echoes caused by a single target object, among the radar echoes obtained in a plurality of scans. For example, the determining submodule 32a may receive from the first extracting submodule 31 the radar echoes detected in the latest scan. Further the determining submodule 32a may read from the approaching velocity memory 28 the positions corresponding to the radar echoes, the dimensions of the spread thereof, and the approaching velocity, etc. detected in an immediately previous scan.

The determining submodule 32a may determine which of the radar echoes read from the approaching velocity memory 28 correspond to the radar echoes extracted by the first extracting submodule 31 (determines the radar echoes caused by the single target object), based on the positions, the dimensions, and the approaching velocity. When the approaching velocity memory 28 does not store radar echoes corresponding to the radar echoes extracted by the first extracting submodule 31, the determining submodule 32a may output one (1) as the number of times of being the threshold or above, to the operating submodule 32b. When the approaching velocity memory 28 stores the radar echoes corresponding to the radar echoes extracted by the first extracting submodule 31, the determining submodule 32a may increment the number of times of being the threshold or above and output the incremented number to the operating submodule 32b.

Regarding the target object of which approaching velocity reaches the threshold or above at least n times, the operating submodule 32b may generate a signal to instruct the start of tracking of the target object (track starting signal), and output it to the tracking module 27. Regarding the target object of which approaching velocity reaches the threshold or above less than n times, the operating submodule 32b may store the information regarding the target object in the approaching velocity memory 28 (storing process). Here, regarding the target object of which approaching velocity is the threshold or above in a previous scan but is not detected in the latest scan, since the radar echoes are not transmitted to the operating submodule 32b, the radar echoes may be deleted from the approaching velocity memory 28.

By repeating the above processing, the target object of which approaching velocity reaches the threshold or above n times may be extracted and the start of the tracking may be instructed.

The tracking module 27 may automatically track the target object specified by the track starting signal outputted from the tracking determining module 26, and output the tracking result (tracking process). The function to track the specified target object is referred to as the TT (Target Tracking) function. Although the detailed explanation of the TT function is omitted since it is known, it is to automatically capture the position of the target object based on the reception data obtained by transmitting and receiving the electromagnetic wave, and estimate the velocity vector by tracking the movement of the target object over time. The tracking result of the tracking module 27 may be outputted to the display controlling module 22 and displayed on the display unit 23 along with the radar image.

The determination performed by the determining submodule 32a may be performed conventionally and the processing amount may be extremely large, for which reason is as follows. For example, in a case where approximately 1,000 target objects are detected by the radar echoes, correspondence between the approximately 1,000 target objects detected in a latest scan and the approximately 1,000 target objects detected in a previous scan thereto may need to be determined. In JP2000-304853A and JP2014-235040A, since the velocity of each target object is detected based on the positional change of the target object, processing of determining the correspondence of the approximately 1,000 target objects is required. In this regard, in this embodiment, it is possible to calculate the velocity in a single scan. For example, in a case where approximately 10 target objects of which approaching velocity reaches the threshold or above (the target objects extracted by the first extracting submodule 31) are detected, since the determination of correspondence of the approximately 10 target objects is required, it is possible to significantly reduce the processing amount.

As described above, the radar apparatus 1 of this embodiment may include the approaching velocity calculating module 24, the tracking determining module 26, the tracking module 27, and the display controlling module 22. The approaching velocity calculating module 24 may calculate the approaching velocity (the velocity component in the transmission direction of the electromagnetic wave, of the target object from which the reflection wave is obtained) based on the phase change of the electromagnetic wave transmitted and received by the radar antenna 11. The tracking determining module 26 may determine whether to track the target object based on the approaching velocity of the target object. The tracking module 27 may automatically track the target object determined to be tracked, by the tracking determining module 26. The display controlling module 22 may display the tracking result of the tracking module 27 along with the radar image.

Since whether to track the target object may be determined based on the approaching velocity which is the velocity of the target object toward the apparatus, it is possible to automatically track a target object having a high collision risk against the apparatus (to be more exact, a movable body on which the apparatus is mounted, etc.). Further, the approaching velocity of the target object may be calculated in a single scan without the determination of the radar echoes as JP2000-304853A and JP2014-235040A, and as a result, it is possible to reduce the processing amount regarding the calculation of the approaching velocity.

Although the suitable embodiment of this disclosure is described as above, the above configuration may be changed as follows, for example.

In this embodiment, only the target object determined to be tracked by the tracking determining module 26 may automatically be tracked; however, in addition to the target object determined by the tracking determining module 26, a target object determined by different processing may also automatically be tracked. Moreover, the tracking module 27 may have a function to track the target object specified by a user, or a function to release the target object from the tracking according to an instruction by a user. Note that in the case where the target object is released from the tracking according to the instruction by the user, in order to prevent this target object from being automatically tracked again, information of the release of the tracking by the user may be stored in association with the target object.

In this embodiment, the two stepped extractions may be performed by the first and second extracting submodules 31 and 32; however, the steps of extraction may be one. For example, the tracking of the target object may be started under a condition that the approaching velocity of the target object obtained in the single scan is a threshold of above. Further the steps of extraction may be three or more.

In this embodiment, the same threshold may be used in the first and second extraction conditions; however, it may be different. Further, in the second extraction condition, it may be required that the approaching velocity of the target object is the threshold or above the plurality of times continuously; however, the tracking may be started when an average value of the approaching velocities calculated in a plurality of scans is a threshold or above.

Note that the first and second extraction conditions of this embodiment may only include the approaching velocity of the target object; however, other condition(s) may be added. For example, in at least one of the first and second extraction conditions, a condition that the distance from the first ship to the target object is a given distance or below may be added to the condition regarding the approaching velocity. Moreover, additionally/alternatively to the condition of the distance from the first ship to the target object, a condition regarding the size of the target object (the size of the target object is a threshold or above, and/or a different threshold or below) may be added.

In this embodiment, the Doppler absolute velocity may be used for the approaching velocity; however, the Doppler relative velocity may be used instead. Although there is a possibility that the channel buoy may be tracked as a result, it is possible to extract the target object to start the tracking of, based on the velocity at which the first and second ships actually approach each other.

In this embodiment, the respective components of the radar apparatus 20 may be disposed in a single housing; however, at least one of them may be disposed at a physically separated position. For example, at least one of the sweep memory 21 to the approaching velocity memory 28 may be disposed in a gearbox near the radar antenna 11.

In this embodiment, the Doppler frequency may be obtained by the pulse Doppler method and the Doppler velocity of the target object may be calculated based on this Doppler frequency. However, the calculating method of the Doppler frequency is not limited to this, and for example, the Doppler velocity may alternatively be calculated based on the frequency change of the electromagnetic wave transmitted and received. Further, the Doppler velocity may be calculated directly based only on the echoes obtained in a single sweep without calculating the Doppler frequency.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein are preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A radar apparatus, comprising:
processing circuitry configured to:
calculate an approaching velocity of a target object from which a reflection wave caused by an electromagnetic wave is obtained, based on a change in one of phase and frequency of the electromagnetic wave transmitted and received by a radar antenna, the approaching velocity being a velocity component in a transmission direction of the electromagnetic wave;

determine whether to track the target object based on the approaching velocity of the target object;

start tracking the target object responsive to determining that the approaching velocity of the target object reached a predetermined threshold a predetermined number of scans; and display a tracking result of tracking the target object along with a radar image.

2. The radar apparatus of claim 1, wherein the processing circuitry determines whether to track the target object based on the approaching velocity calculated in a single scan.

3. The radar apparatus of claim 1, wherein the approaching velocity is one of a plurality of approaching velocities for each target object, each of the plurality of approaching velocities for each target object being calculated in a corresponding one of a plurality of radar scans of the radar apparatus, the radar apparatus further comprising a memory configured to store the plurality of approaching velocities, respectively, for each target object, wherein the processing circuitry is further configured to determine whether the target object is a tracking candidate based on the approaching velocity calculated in a single scan, and determine whether to track the target object determined as the tracking candidate, based on the plurality of approaching velocities of the target object and stored in the memory.

4. The radar apparatus of claim 3, wherein the processing circuitry determines radar echoes obtained from a single target object among radar echoes obtained in the plurality of radar scans, based at least on the approaching velocities.

5. The radar apparatus of claim 3, the processing circuitry further configured to detect a representative point defining a representative position of the target object, wherein the processing circuitry determines whether to track the target object based on the plurality of approaching velocities, each of which are calculated by using a plurality of electromagnetic waves obtained from the target object in the single scan by the radar antenna.

6. The radar apparatus of claim 5, wherein the processing circuitry detects the representative point based on a distance and/or a bearing direction of radar echoes.

7. The radar apparatus of claim 1, wherein the approaching velocity is a relative velocity of the target object to the apparatus in the transmission direction of the electromagnetic wave.

8. The radar apparatus of claim 1, wherein the approaching velocity is one of a plurality of approaching velocities for each target object, the radar apparatus, each of the plurality of approaching velocities for each target object being calculated in a corresponding one of a plurality of radar scans of the radar apparatus, the processing circuitry further configured to detect a representative point defining a representative position of each target object, wherein the processing circuitry determines whether to track the target object based on the plurality of approaching velocities, each of which are calculated by using a plurality of electromagnetic waves obtained from the target object in a single scan by the radar antenna.

9. The radar apparatus of claim 8, wherein the processing circuitry detects the representative point based on a distance and/or a bearing direction of radar echoes.

10. A method of tracking a target object, comprising:

calculating an approaching velocity of a target object from which a reflection wave caused by an electromagnetic wave is obtained, based on a change in one of phase and frequency of the electromagnetic wave transmitted and received by a radar antenna, the approaching velocity being a velocity component in a transmission direction of the electromagnetic wave;

determining whether to track the target object based on the approaching velocity of the target object; and starting tracking the target object responsive to determining that the approaching velocity of the target object reached a predetermined threshold a predetermined number of scans; and displaying a tracking result of tracking the target object along with a radar image.

11. The method of tracking the target object of claim 10, wherein the determining whether to track includes determining whether to track the target object based on the approaching velocity calculated in a single scan.

12. The method of tracking the target object of claim 10, wherein the approaching velocity is one of a plurality of approaching velocities for each target object, each of the plurality of approaching velocities for each target object being calculated in a corresponding one of a plurality of radar scans of a radar apparatus, the method further comprising storing the plurality of approaching velocities for each target object, wherein the determining whether to track includes determining whether the target object is a tracking candidate based on the approaching velocity calculated in a single scan, and determining whether to track the target object determined as the tracking candidate, based on the plurality of approaching velocities of the target object.

* * * * *

UNITED STATES PATENT AND TRADEMARK OFFICE
CERTIFICATE OF CORRECTION

PATENT NO.        : 10,514,455 B2
APPLICATION NO.   : 15/408829
DATED             : December 24, 2019
INVENTOR(S)       : Daisuke Fujioka It is certified that error appears in the above-identified patent and that said Letters Patent is hereby corrected as shown below:

In the Claims

In Column 13, Line 21, Claim 3, delete "," following 'velocities' and;

In Column 13, Line 22, Claim 3, delete "respectively,".

Signed and Sealed this
Twenty-fifth Day of February, 2020

Andrei Iancu
*Director of the United States Patent and Trademark Office*